United States Patent [19]

Watanabe et al.

[11] Patent Number: 5,190,286
[45] Date of Patent: Mar. 2, 1993

[54] IMAGE SYNTHESIZING SYSTEM AND SHOOTING GAME MACHINE USING THE SAME

[75] Inventors: Naoki Watanabe, Komae; Toshiaki Shinbo, Kawasaki; Mitsuru Ogata, Ohmiya, all of Japan

[73] Assignee: Namco, Ltd., Tokyo, Japan

[21] Appl. No.: 764,171

[22] Filed: Sep. 23, 1991

[30] Foreign Application Priority Data

Sep. 27, 1990 [JP] Japan .................. 2-257970

[51] Int. Cl.⁵ .............................. A63F 9/22
[52] U.S. Cl. ..................... 273/85 G; 273/DIG. 28
[58] Field of Search .......................... 273/310–313, 273/85 R, 85 G, DIG. 28; 434/20–23

[56] References Cited

U.S. PATENT DOCUMENTS

| | | | |
|---|---|---|---|
| 2,467,180 | 4/1949 | Anderson | 273/312 |
| 4,189,145 | 2/1980 | Stubben et al. | 273/313 |
| 4,490,745 | 12/1984 | Erickson et al. | 273/85 G |
| 4,710,873 | 12/1987 | Breslow et al. | 364/410 |

FOREIGN PATENT DOCUMENTS 2111808 7/1983 United Kingdom ............. 273/85 G

Primary Examiner—Benjamin H. Layno
Attorney, Agent, or Firm—Oliff & Berridge

[57] ABSTRACT

The present invention provides an image synthesizing system for forming a synthesized image by superimposing two images one on another through a half mirror. The image synthesizing system includes a half mirror located in an optical path extending toward a display section; a diorama disposed in one of the transmissive- and reflective-side optical paths and having at least one movable part; and a video display disposed in the other of said transmissive- and reflective-side optical paths such that the video scene of said video display will be superimposed over the image of said diorama through said half mirror. The video scene is superimposed over the image of the diorama to form a synthesized scene such that the video scene is variable in combination with the motion of the movable part in the diorama.

18 Claims, 11 Drawing Sheets

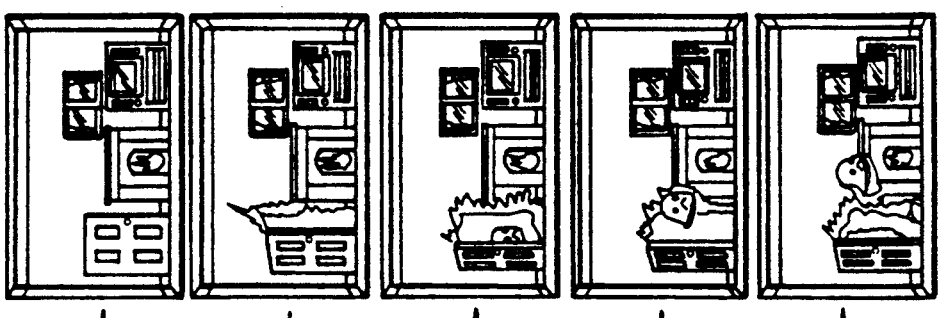
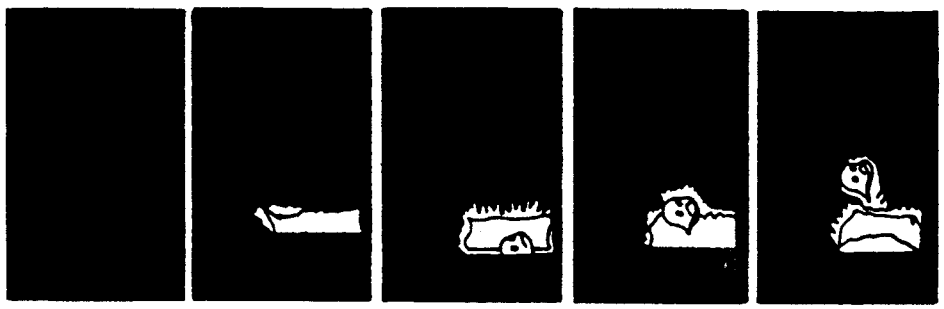
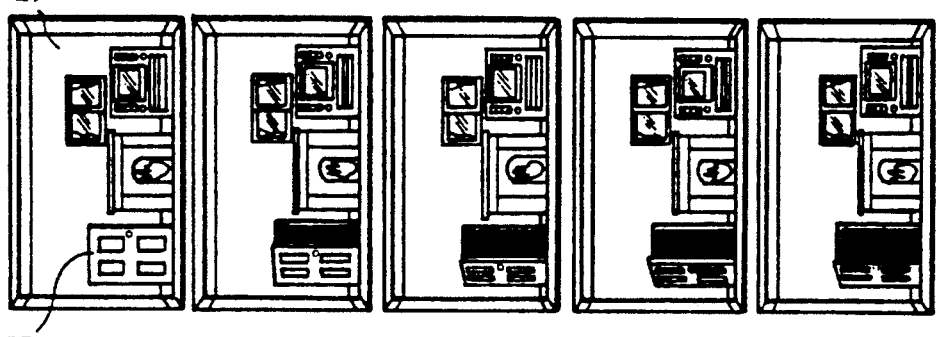

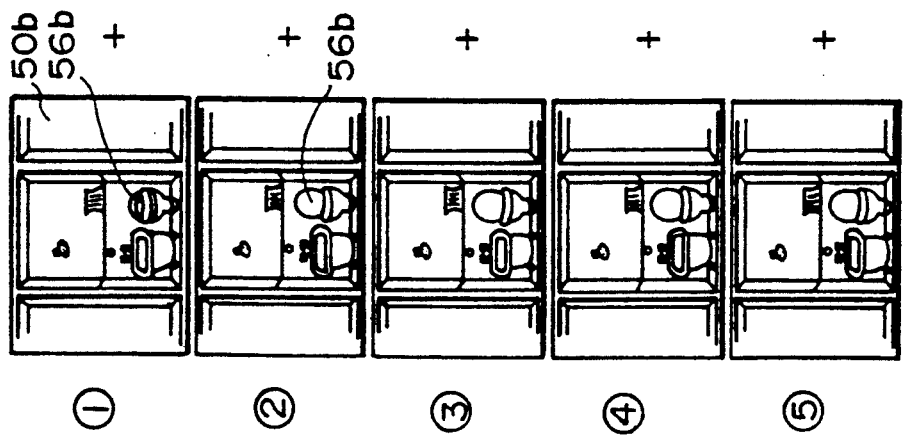
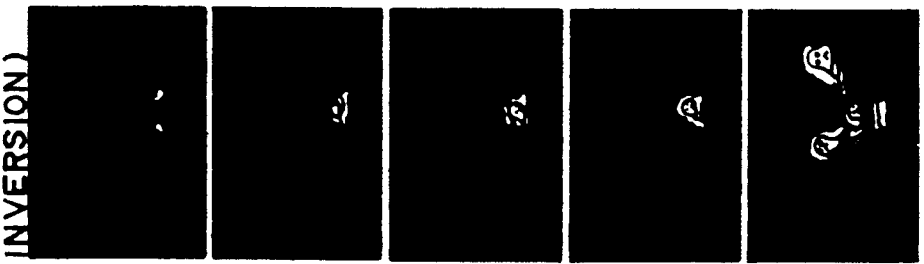
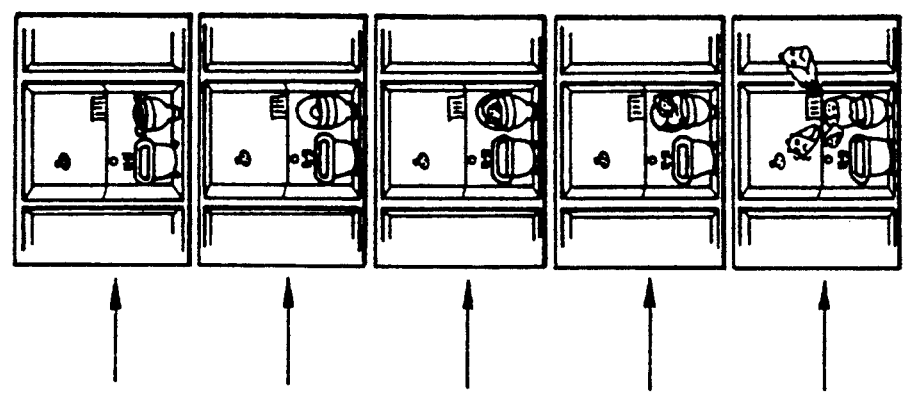

IMAGE SYNTHESIZING SYSTEM AND SHOOTING GAME MACHINE USING THE SAME

BACKGROUND OF THE INVENTION

1. Field of the Invention

The present invention relates to an image synthesizing system comprising a half mirror which is used to synthesize two images and a shooting game machine using such an image synthesizing system.

2. Description of the Related Art

There are well-known various techniques of image synthesization for synthesizing and displaying two images by the use of a half mirror. A display system relating to such techniques is disclosed in Japanese Utility Model Laid-Open No. Sho 62-89689. A display method relating to such techniques is disclosed in Japanese Patent Laid-Open No. Sho 60-84573.

This display system of the prior art comprises a half mirror having one optical path in which a video monitor is located, with an object to be displayed being located in the other path of the half mirror. The half mirror serves to display a combination of a video monitor scene with the object to be displayed.

In the aforementioned display method of the prior art, as shown in FIG. 11, a half mirror 2 is disposed ahead of an observer M. An image is projected onto the half mirror 2 through a projector 3 located at the same side of the half mirror as the observer M so as to form a reflective image. An object 5 is disposed at the opposite side of the half mirror to the observer M. As a result, the reflective image formed on the half mirror face will be superimposed on the image of the object observed through the half mirror.

Such arrangements can display many kinds of images in combination and are then highly expected to provide many advantages in various fields such as advertisement, education and others.

In the prior art, however, only a still object can be superimposed on a moving image on the video monitor or from the projector. The motion in the synthesized image can be provided only by the video monitor or projector. Thus, the prior art has a limitation in visual representation.

SUMMARY OF THE INVENTION

It is therefore the primary object of the present invention to provide an image synthesizing system which comprises a diorama having at least a movable part and means for causing the motion of a video scene to vary in combination with the motion of the movable part of the diorama and for displaying a synthesized image formed by superimposing the diorama image on the video scene, whereby a visually varied representation can be provided.

Another object of the present invention is to provide an image synthesizing system which can prevent any external light from entering the synthesized image.

Still another object of the present invention is to provide a shooting game machine which is improved in visual representation by utilizing the image synthesizing system described above and which comprises a shooting device for shooting various target characters displayed from the image synthesizing system in combination with the movable part of the diorama.

To this end, the present invention provides an image synthesizing system comprising a half mirror located in an optical path extending toward a display section; a diorama disposed in one of the transmissive-side and reflective-side optical paths of said half mirror, said diorama having at least one movable part; a video display located in the other of the transmissive-side and reflective-side optical paths of said half mirror, said video display being arranged so that the video scene can be superimposed over the image of the diorama through the half mirror; and control means for controlling the video scene while maintaining a predetermined relationship between said video scene and the motion of the movable part of said diorama, whereby the video scene can be superimposed on the image of the diorama to form and display a synthesized image while varying the video scene in combination with the motion of the movable part of the diorama.

The present invention also provides an image synthesizing system of the above type which comprises a transparent curved window having a center of curvature positioned below or above the visual point of the observer such that any external light will not enter the synthesized image being displayed.

The present invention further provides a machine for playing a shooting game by shooting the image of a target character synthesized with the image of the movable part of the diorama in combination with its motion by said image synthesizing system, said machine comprising shooting means located opposed to a display section on which said synthesized image is displayed, said shooting means having trigger-shaped actuator means which generates a trigger signal when said actuator means is operated; means for detecting a sight taken in said shooting means; and hit discriminating means for detecting the area of the target character which is to be hit by said shooting means, based on the position of said target character controllably displayed by said control means and for judging whether or not the position of said sight is in said area when said trigger signal is generated.

As well-known, the diorama is a three-dimensional model in which various matters such as people, buildings and others are three-dimensionally reproduced in a reduced size.

The image synthesizing system of the present invention displays an image synthesized by superimposing the image of the diorama on a video image at the display by the use of the half mirror.

The present invention is characterized by that said diorama includes at least one movable part and that the video image is controllably displayed in combination with the motion of the movable part in the diorama. Thus, the present invention may provide visually varied video representations in combination with the motion of the movable part in the diorama.

In the accompanying drawings, FIG. 1 shows an example of possible synthesized images according to the present invention. As seen from FIG. 1(A), a diorama includes a movable part, for example, a door which is opened in sequence as shown by ①, ②, . . . ⑤ in FIG. 1.

As video images to be superimposed over the image of said diorama, there is an external light entering a room through the partially opened door and a character image moving inwardly into the room through the partially opened door, as shown in FIG. 1(B). The image of the diorama shown in FIG. 1(A) is superimposed over the video image shown in FIG. 1(B) to synthesize such a scene that as the door is being opened in the diorama, the light enters the room through the partially opened door and also the character moves into the room together with the external light. Thus, a visually varied representation may be provided by superimposing the three-dimensional feel of the diorama over the varied video image in a fixed relationship.

Such an image synthesizing system can provide a visually improved representation in various fields such as games, advertisements and others.

In the image synthesizing systems, the interior of the display section is frequently formed as a darkroom. In such an event, the synthesized image may be visually damaged by penetrating any external light thereinto.

In order to overcome the latter problem, it is preferred that the image synthesizing system includes a transparent curved window having a center of curvature which is located below or above the visual point of the observer. This curved window prevents the external light from entering the visual point of the observer to provide a superior synthesized image.

Where the image synthesizing system is applied to a shooting game machine, a target character may be displayed from the video scene in combination with the motion of the movable part of the diorama. Since the position of the target character being displayed is given as image data in the video scene, it can be really judged whether or not the target is hit, based on the use of data relating to the hit area and hit position in the image of the character, even if the target character moves in random. Thus, the present invention can provide an improved shooting game machine which is visually varied and highly entertaining to a player.

BRIEF DESCRIPTION OF THE DRAWINGS

FIGS. 1 and 2 illustrate two examples of procedure for synthesizing images in an image synthesizing system, in which FIGS. 1 or 2(A) shows the varying condition of a movable part in a diorama; FIGS. 1 or 2(B) shows the varying condition of a video scene to be superimposed and displayed on the image of the diorama and FIGS. 1 or 2(C) shows a synthesized image formed by superimposing the images shown in FIGS. 1 or 2(A) and (B) together;

DETAILED DESCRIPTION OF THE PREFERRED EMBODIMENTS

Figure 3:
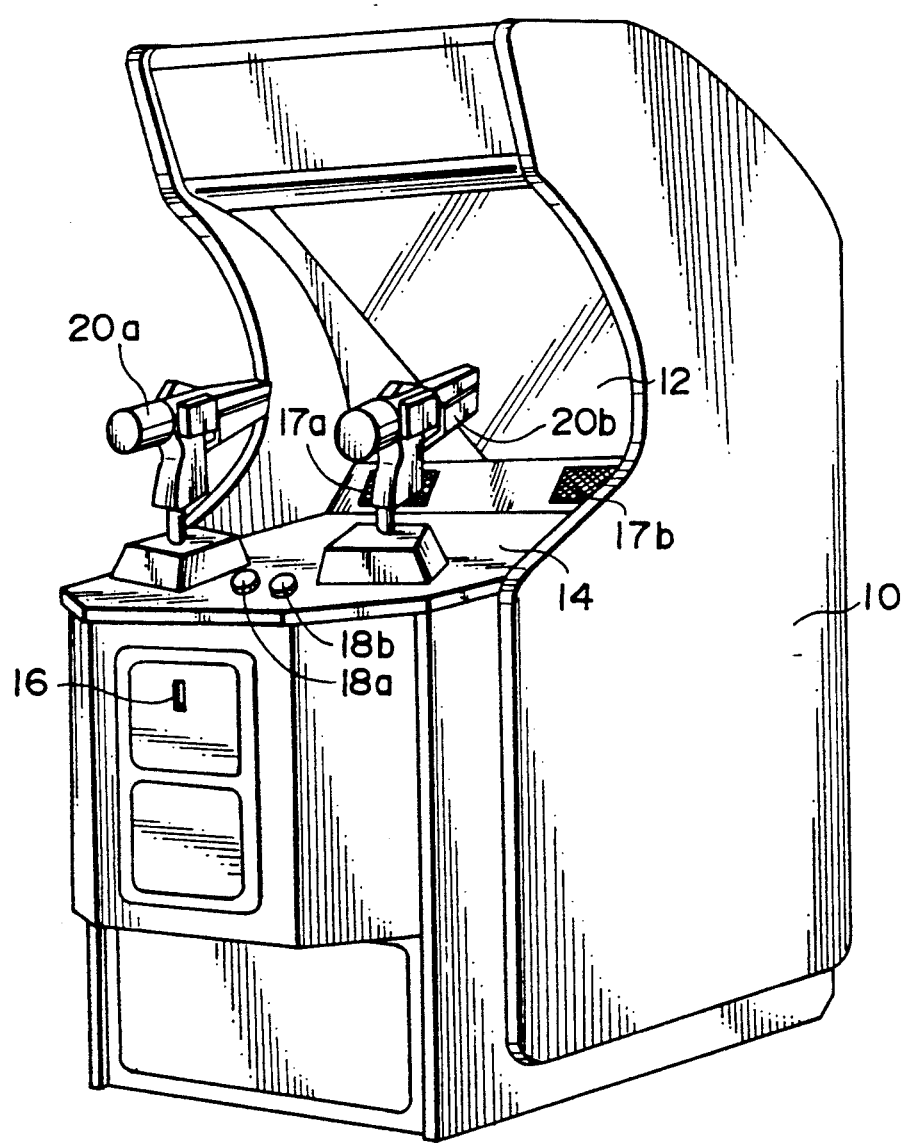
FIG. 3 is a perspective view of a shooting game machine incorporating the principle of the present invention.

Referring now to FIG. 3, there is shown a shooting game machine constructed in accordance with the present invention, which comprises a housing 10 and a display window 12 located at the upper portion of the housing 10 and adapted to display a target synthesized image at the deep position thereof. A table 14 extends forwardly from the lower edge of the display window 12. On the table 14 are disposed a pair of shooting devices 20a and 20b which are oriented toward the display window 12.

Each of the shooting devices 20a and 20b is adapted to sight a target displayed in the display window 12, the direction of sight being detected in an electrical manner.

Figure 4:
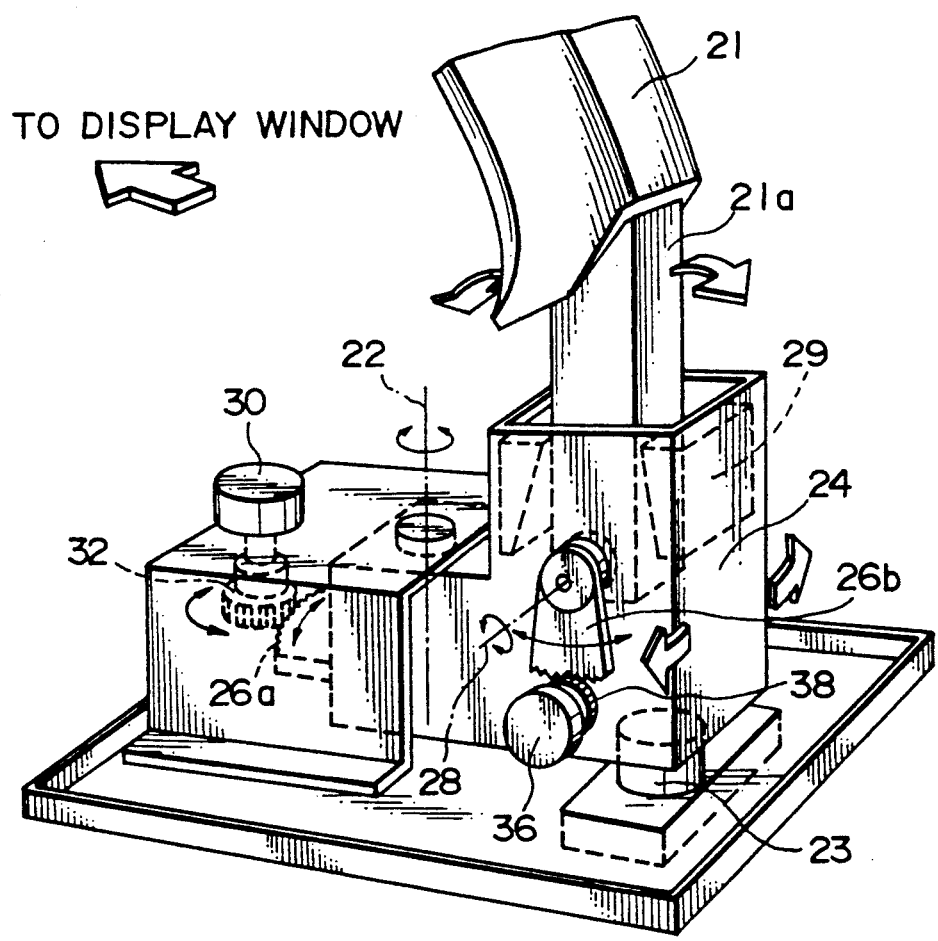
FIG. 4 is a view exemplifying a mounting structure for one shooting device in the shooting game machine of FIG. 3.

FIG. 4 shows a structure for mounting each shooting device 20 on the table 14. The mounting structure includes a holding frame 24 supported on the table 14 through a shaft 22 for horizontal rotation. The gun grip 21 of the shooting device 20 is mounted on the holding frame 24 through a shaft 28 for vertical rotation. In such a manner, the shooting device 20 can be sighted to the display window 12 in all the directions.

The horizontal rotation of the shooting device 20 is limited by engagement of the holding frame 24 with a stopper 23 on the table 14. The vertical rotation of the shooting device 20 is restricted by engagement of paired stoppers 29 in the holding frame 24 with a supporting arm 21a extending downwardly from the gun grip 21.

Horizontal and vertical volumes 30 and 36 are provided to define sight detecting means for detecting the direction of sight in the shooting device 20. The horizontal volume 30 includes a gear wheel 32 fixedly mounted on its rotating shaft, the gear wheel being engaged by a sector gear 26a on the holding frame 24. Thus, the horizontal volume 30 can detect the horizontal direction of sight in the shooting device 20 as an X coordinate. The vertical volume 36 includes a gear wheel 38 fixedly mounted on its rotating shaft, the gear wheel 38 being engaged by a sector gear 26b rotated with the horizontal shaft 28 as a unit. Thus, the vertical volume can detect the vertical direction of sight in the shooting device 20 as a Y coordinate.

The sight detecting means detects the direction of sight in the shooting device 20 as X and Y coordinate data from changes in the resistance of the volumes 30 and 36.

When it is time to play the shooting game machine shown in FIG. 3, a given coin is thrown into the machine through a coin inlet 16. A game scene is then displayed in the display window 12 at the deep position and at the same time the machine asks whether single-player or paired-player mode should be selected. In response to the machine's question, a single-player button 18a or paired-player button 18b is depressed to initiate the shooting game.

If the single-player mode is selected, a player may use only one of the shooting devices 20a and 20b to shoot targets displayed in the display window 12. If the paired-player mode is selected, both the shooting devices 20a and 20b may be used to play the game. In FIG. 3, reference numerals 17a and 17b designate speakers for outputting various sounds and voices in the game.

Figure 5:
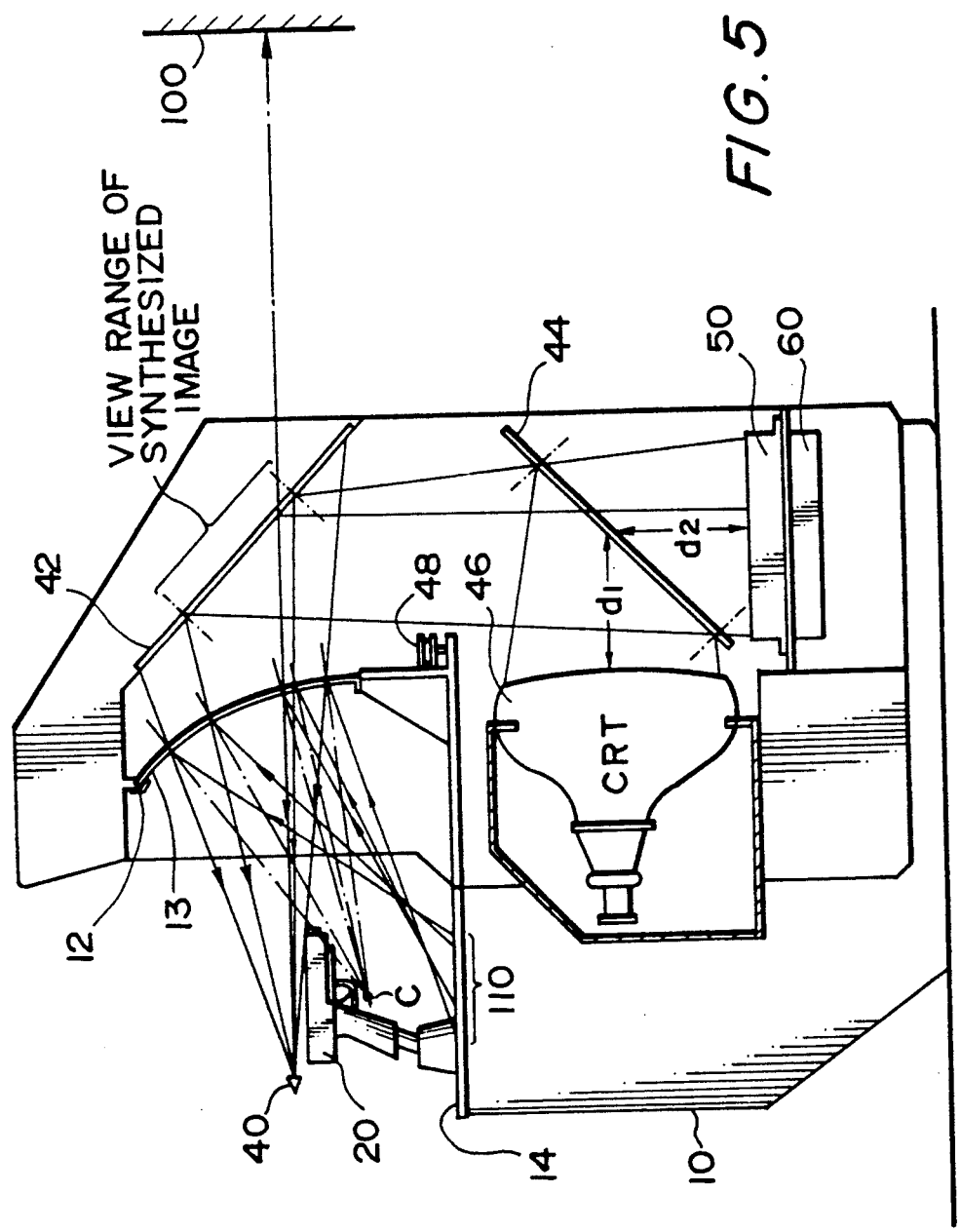
FIG. 5 is a schematic side view, partially broken, of the shooting game machine, illustrating the principle of the present invention.

FIG. 5 shows an arrangement of displaying a synthesized image in the display window 12 at the deep position.

In this embodiment, the interior of the housing 10 is formed as a darkroom. The housing 10 includes a total reflection mirror 42 located opposite to the eye-point 40 of the player through the display window 12 and inclined 45 degrees relative to the horizontal plane. The lower portion of the housing 10 receives a half mirror 44 disposed opposite to the total reflection mirror 42 and inclined 45 degrees relative to the horizontal plane, but in the opposite direction.

The half mirror 44 has a reflection-side optical path in which a video display or CRT 46 is disposed and a transmission-side optical path in which a diorama 50 is arranged. The half mirror 44 serves to synthesize the image of the diorama 50 with the video scene displayed on the CRT 46 to form a synthesized image which is in turn totally reflected to the eye-point 40 of the player by the total reflection mirror 42 through the display window 12.

When the player observes the interior of the display window 12 at the eye-point 40, he or she will see a virtual image 100 formed behind the total reflection mirror 42 (rightward as viewed in FIG. 5) by synthesizing the images of the diorama 50 and CRT 46. In this embodiment, even if the housing 10 has its small depth, the synthesized image can be displayed, as a virtual image, in the housing at a position much deeper or farther than the rearward side thereof. Thus, there can be provided an increased distance between each of the shooting devices 20 and a target defined by the synthesized image.

This embodiment is so designed that the CRT 46 is positioned below the table 14 and that the distance $d_1$ between the CRT 46 and the half mirror 44 is substantially equal to or slightly smaller than the distance $d_2$ between the diorama 50 and the half mirror 44. Thus, the distance between the eye-point 40 of the player and the surface of the CRT 46 becomes substantially equal to or slightly smaller than the distance between the eye-point 40 of the player and the surface of the diorama 50. As a result, the synthesized image will be formed by superimposing the video scene on or slightly ahead of the surface of the diorama 50.

A score display 48 for displaying information such as score and others at the edge of the synthesized image is provided at a mid position between the total reflection mirror 42 and the half mirror 44. The score on this display 48 is totally reflected to the eye-point 40 through the total reflection mirror 42.

Figure 6:
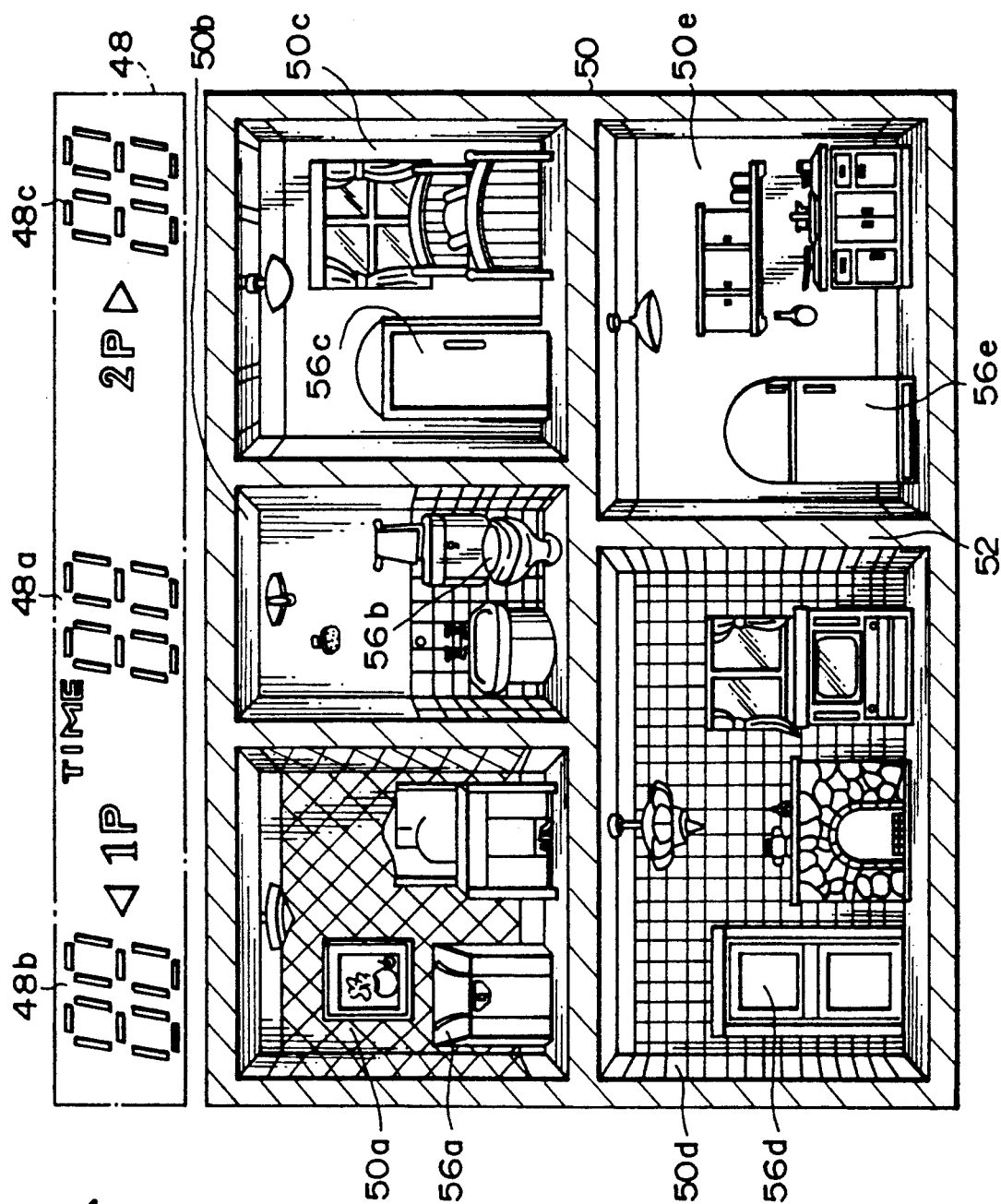
FIG. 6 is a view showing a combination of the diorama image with a score display.

FIG. 6 shows a combination of the diorama 50 with the image on the score display 48, which can be viewed from the direction of the eye-point 40.

The score display 48 includes a time display section 48a, a score display section 48b used to indicate the score for one of the shooting devices 20a in the single-player mode, and another score display section 48c used to indicate the score for the other shooting device 20b in the paired-player mode. These display sections 48a, 48b and 48c are made of phototube sections. When the display 48 is turned on, the background thereof is not visible in the darkroom of the housing 10, but only the display sections 48a, 48b and 48c become visible remarkably.

Particularly, since the distance between the eye-point 40 and the display 48 is smaller than that between the eye-point 40 and the diorama 50, the far and near feel from the eye-point 40 to the diorama 50 can be emphasized in the illustrated embodiment.

In this embodiment, the diorama 50 is formed to be a three-dimensional model having a plurality of rooms which are partitioned by a frame 52. More particularly, there are three rooms 50a, 50b and 50c on the second floor and two rooms 50d and 50e.

Figure 7:
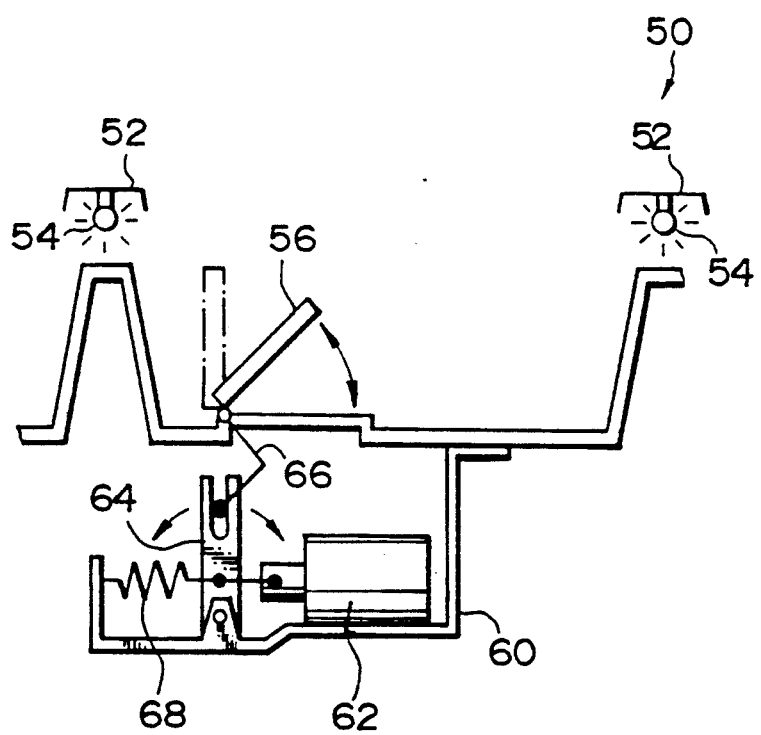
FIG. 7 is a schematic view illustrating an actuator for driving a movable part in the diorama.

FIG. 7 is a cross-sectional view of one room in the diorama 50. Since the diorama 50 is in the darkroom of the housing 10, the diorama 50 is not visible from the eye-point 40 as it is. Thus, the diorama 50 includes linear sources of light 54 which are located on the inside of the frame 52. The rooms 50a, 50b . . . and 50e are illuminated by these linear sources of light 54 as they are turned on.

The present invention is characterized in that the diorama 50 has at least one movable part and that the video scene is controllably displayed in a predetermined relationship with the motion of the movable part in the diorama 50. In the illustrated embodiment, each of the rooms 50a, 50b . . . and 50e has one movable part 56a, 56b, 54c, 54d or 50e.

For example, the movable part of the room 50a is a lid 56a for a chest; the movable part of the room 50b is a lid 56b for a toilet stool; the movable parts of the rooms 50c and 50d are doors 56c and 56d; and the movable part of the room 50e is a door 56e for a refrigerator.

Each of the movable parts 56a, 56b . . . 56e can be controllably opened and closed by an actuator 60 which is disposed behind it.

Returning to FIG. 7, the actuator 60 comprises a solenoid 62, a pivotal member 64, a connecting arm 66 and a spring 68. As the solenoid 60 is in its OFF state, the movable part 56 is in its closed position. As the solenoid 62 is energized, the pivotal member 64 is rotated against the action of the spring 68. Thus, the movable part 56 will be opened through the arm 66 connected with the forward end of the pivotal member 64.

FIGS. 1 and 2 exemplify two kinds of video scenes controllably displayed on the CRT 46 in combination with the motion of the movable part 56.

For example, in the room 50d of the diorama 50, the door 56d is gradually opened as shown in FIG. 1(A). The video scene on the CRT 46 is correspondingly controlled as shown in FIG. 1(B). An external light will enter the room 56 through a gap formed by the partially opened door 56d (see FIG. 1(B)①). As the door 56d is further opened, a monster which is a target jumps into the room 50d therethrough (see FIG. 1(B)③-⑤).

When the video scene is combined with the image of the diorama 55 by using the half mirror 44, a synthesized scene can be obtained as shown in FIG. 1(C). The resulting synthesized scene will provide the target character jumping into the room 50d with the externally entering light as the door 56d is gradually opened. Thus, such a synthesized scene will be displayed in an effective combination of the three-dimensional vision of the diorama 50 with the colored and varied video scene and particularly in the intimate relationship between the actual motion of the movable diorama part and the video scene. Therefore, a visually varied scene can be synthesized by the present invention, in contrast to the synthesized scene of the prior art wherein the stationary three-dimensional image of the diorama is combined with the video scene.

In the synthesized scene of FIG. 2, the lid 56b of the toilet stool is gradually opened as shown in FIG. 2(A). External light then enters the room 50b through the gradually opened toilet stool lid 56b. As the toilet stool lid 56b is fully opened, monsters sequentially jump into the room 50b.

This will provide a visually varied scene synthesized from the movable diorama part and the video scene wherein many monsters displayed by the video scene jump into the room while gradually lifting the toilet stool lid.

A player can play the shooting game while viewing the synthesized scene displayed in the display window 12 at its deep position. For example, the player shoots the monsters jumping into the room through the partially opened door as shown in FIG. 1 or the monsters jumping into the room out of the opened toilet stool as shown in FIG. 2.

In accordance with the present invention, the target monsters are displayed on the CRT 46 as video images. Even if they move about, the position of each of the displayed monsters can be detected in real time as X- and Y-coordinates on the displayed position of the CRT. If X- and Y-coordinates indicative of a direction of sight in a shooting device 20 are compared with X- and Y-coordinates of a monster displayed as a target on the CRT 46, at a timing whereat the trigger of the shooting device 20 is actuated, it can be discriminated in real time whether or not the target is hit.

In this embodiment, the CRT 46 and diorama 50 are located within the darkroom of the housing 10. If the synthesized image displayed in the display window 12 at its deep position is viewed from the eye-point 40, any external light may enter the darkroom through the display window so that the synthesized image will not be viewed very well.

In order to overcome this problem, the display window 12 of this embodiment is in the form of a transparent curved window having its center of curvature which is located below the eye-point 40. More particularly, the display window 12 includes an arcuate curved acrylic hood 13 mounted thereon and having its center of curvature located at a position shown by C in FIG. 5.

When the total reflection mirror 42 is viewed from the eye-point 40, one will observe a portion 110 of the table 14 reflected onto the acrylic curved hood 13 as shown in FIG. 5. However, if this reflected portion 110 of the table 14 is black- or dark-colored, it will not reflected over the hood 13. Thus, the synthesized image formed on the total reflection mirror 42 can be viewed by the player very well.

Figure 8:
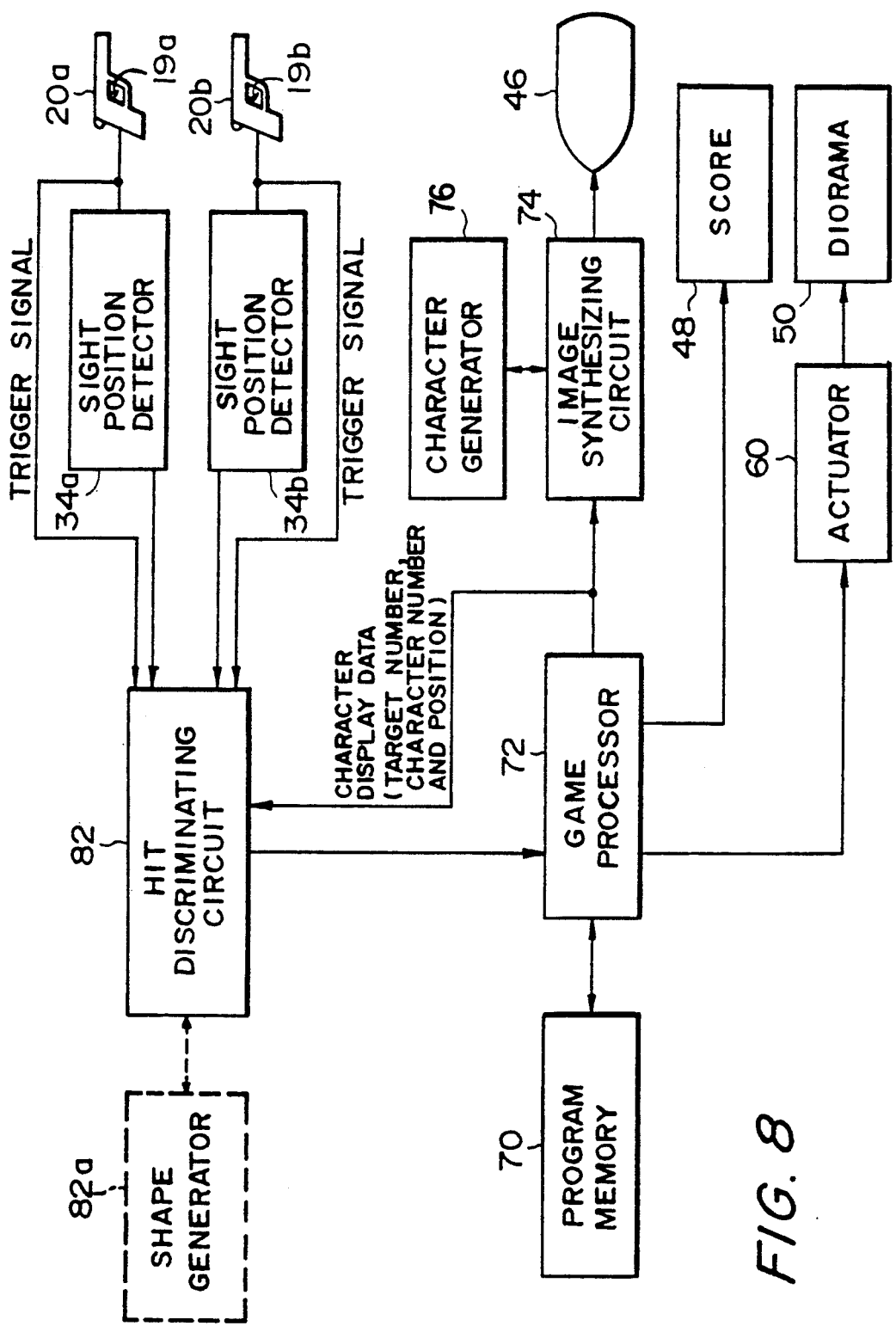
FIG. 8 is a block diagram of a circuitry used in the shooting game machine.

FIG. 8 shows a preferred embodiment of a circuitry usable in the shooting game machine constructed according to this embodiment.

The circuitry comprises a program memory 70 in which a game program has been written and a game processing circuit 72 for processing data in accordance with the game program.

The game processing circuit 72 is adapted to control the linear sources of light 54 in the diorama 50 with respect to their ON and OFF states and also to control the respective actuators 60 to open and close the movable parts 56 in the diorama 50.

In connection with the control of the movable parts 56 in the diorama 50, the game processing circuit 72 supplies control signals used to synthesize the video scene to an image synthesizing circuit 74. The control signals include data of characters jumping into the rooms through the movable parts 56 as they are controllably opened or closed and data of backgrounds displayed in combination with the displayed characters. The data used for character display includes data of numbers used to specify the types of displayed characters, data of character numbers used to specify the shapes of the displayed characters and data of coordinates ($X_C$, $Y_C$) used to specify the position of each of the displayed characters.

A character generator 76 has previously stored various character data including data relating to the shapes of various characters displayed as targets and data relating to the other shapes.

The image synthesizing circuit 74 synthesizes and displays a video scene including various target characters jumping into the rooms through the movable parts 56 of the diorama 50 in connection with the opening and closing of the movable parts 56, based on data inputted thereinto from the game processing circuit 72. More particularly, the image synthesizing circuit 74 reads data of a character haiving its shape corresponding to a character number data from the character generator 76 on the basis of the inputted data and combines it with a given background to form and display a synthesized scene on the CRT 46.

In such a manner, a video scene as shown in FIGS. 1(B) or 2(B) will be displayed on the CRT 46 in combination with the motion of a movable part 56 in the diorama 50. As a result, a synthesized scene as shown in FIG. 1(C) or 2(C) can be observed from the eye-point 40 shown in FIG. 5.

While viewing such a synthesized and displayed scene, the player sights and shoots characters (or monsters) jumping into the rooms through the movable parts 56 of the diorama 50 by the use of his shooting device 20. The sight position of the shooting device 20 is detected as X- and Y-coordinates by the sight detecting circuit 34, with the detected result being outputted to a hit discriminating circuit 82. As previously described, the sight detecting circuit 34 comprises the horizontal and vertical volumes 30 and 36.

In synchronization with the actuation of the trigger 19, the shooting device 20 outputs a trigger signal to the hit discrimination circuit 82. When received the trigger signal, the hit discriminating circuit 82 judges whether or not the target is hit, by taking the X- and Y-coordinates of the sight position detected on input of the trigger signal as a hit position ($X_B$, $Y_B$).

In this embodiment, a character displayed as a target has a hit area having a predetermined magnitude. When the hit position is in this hit area, the hitting of the shooting device is judged.

The calculation of the hit area is performed by using data used to display a character as a target, among data outputted from the game processing circuit 72 to the image synthesizing circuit 74. More particularly, the hit area in the character displayed on the CRT 46 as a target is calculated from the data of character number and position included in the character display data.

If all the shapes of hit areas each defining a hit region in each character are of the same size, the hit discriminating circuit 82 may calculate the hit area of each character in a simple manner.

Figure 9:
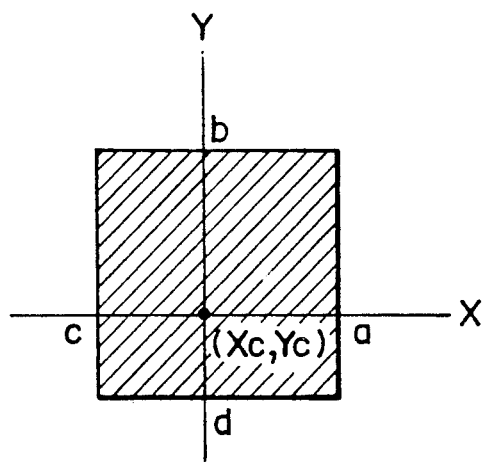
FIGS. 9 and 10 illustrate hit areas in a character displayed in the video scene.

For example, if a hit area of each character is set to be of a rectangular configuration as shown in FIG. 9, the hit area (X, Y) relative to the position of that displayed character ($X_C$, $Y_C$) is represented by:

$$(X_C-c) \leq X \leq (X_C+a)$$

$$(Y_C-d) \leq Y \leq (Y_C+b) \tag{1}$$

The hit discriminating circuit 82 judges whether or not a hit position ($X_B$, $Y_B$) is contained in the hit area (X, Y) represented by the formula (1). If they are contained, the hitting is judged. Thereafter, the hit discriminating circuit 82 outputs a hit detection signal to the game processing circuit 72.

On the contrary, if all the characters to be displayed have different hit area shapes, it is preferred to use a shape generator 82a shown by one-dash chain line in FIG. 8. The shape generator 82a have previously stored various shapes of hit area in the characters to be displayed by using their character numbers as addresses.

Each time data of a character displayed as a target is input in the hit discriminating circuit 82, the latter reads the shape of hit area in that character based on its character number and hit position. The read data will be used to discriminate whether or not the hit position is in the hit area of the character.

Figures 10A, 10B:
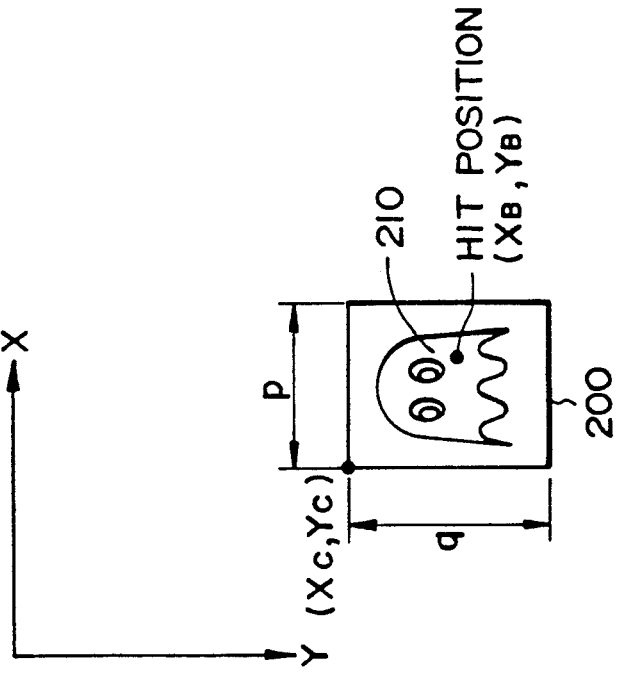
Figure 11:
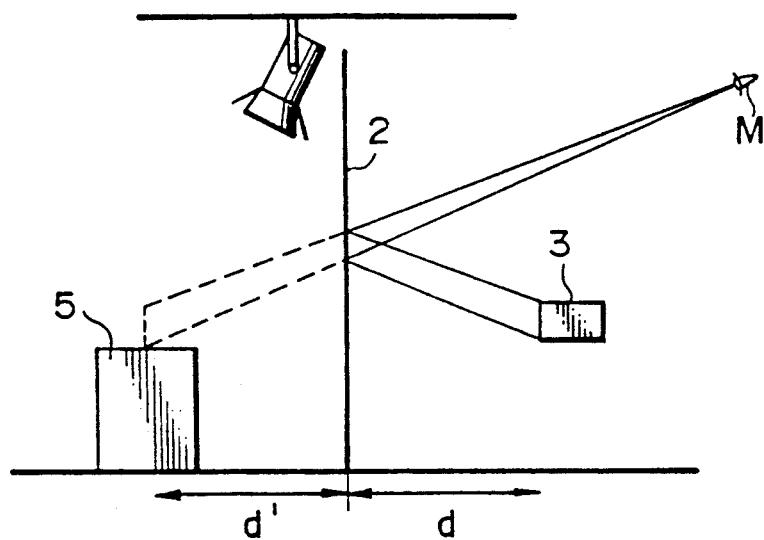
FIG. 11 is a view showing an image synthesizing system constructed in accordance with the prior art.

It is now assumed that a character to be displayed as a target has a shape as shown in FIG. 10(A) and this shape is set as shown in FIG. 10(B). In FIG. 10(A), this character is defined to be displayed on the screen at its leftward and upward corner and has a character area defined by pixels p×q. In the hit area shape data of FIG. 10(B), only pixels represented by "1" define a hit area shape.

In this case, the hit discriminating circuit 82 first calculates the following coordinates from a hit position $(X_B, Y_B)$ inputted thereinto and the display position $(X_C, Y_C)$ of that character:

$$(X_B - X_C)$$

$$(Y_B - Y_C) \quad (2)$$

It is next discriminated based on the following formula whether or not the calculated coordinates are within a range of display in the character area 200 defined by pixels p×q:

$$0 \leq (X_B - X_C) \leq p$$

$$0 \leq (Y_B - Y_C) \leq q \quad (3)$$

If the coordinates determined by the formula (2) is judged to meet the formula (3), the hit discriminating circuit 82 then reads data of bits corresponding to the coordinates determined by the formula (2) in the hit area shape data from the shape generator 82a, and judges whether or not this data is "1" representative of the hit area. If the data is "1", the hit discriminating circuit 82 judges that the hit position is within the hit area 210 of the character and outputs a hit detection signal to the game processing circuit 72.

In this embodiment, a series of judgements with respect to hitting will be performed in response to trigger signals from the shooting device 20 as follows:

The hit discriminating circuit 82 judges a sight position detected by the sight detecting circuit 34 as a hit position $(X_B, Y_B)$ each time a trigger signal is input into the hit discriminating circuit 82. At each of such judgments, said series of judgments with respect to hitting is executed by the hit discriminating circuit 82.

Alternatively, the hit discriminating circuit 82 may always judge whether or not the sight position of the shooting device 20 is within the hit area of the character. As a trigger signal is input from the shooting device 20 to the hit discriminating circuit 82, the latter outputs a hit detection signal based on the result of this judgement. In such a manner, the judgment of hitting can be accurately performed even if the characters have different shapes of hit areas.

The game processing circuit 72 calculates the score in the game and causes it to be displayed on the score display 48. At the same time, the game processing circuit 72 outputs, to the image synthesizing circuit 74, a control signal used to image the hit character on the CRT 46.

In such a manner, the present invention provides a shooting game system which is played by judging in real time whether or not a target is hit, based on the hit area of the target and the hit position of the shooting device 20, even if the position of the target displayed is arbitrarily variable.

On operation, a coin is first thrown into the shooting game machine through the coin inlet 16. Next, the button 18a or 18b is depressed to select one of the single- or paired-player modes.

It is now assumed that the button 18a is actuated to select the single-player mode.

After this selection, a shooting game scene will be displayed in the display window 12 at its deep position. This shooting game scene is provided by synthesizing a video scene on the CRT 46 with the three-dimensional image of the diorama 50 shown in FIG. 5 through the half mirror 40. The synthesized scene is displayed in the form of a virtual image 100 as located behind the total reflection mirror 42 as viewed from the eye-point 40.

In this embodiment, further, the acrylic curved hood 13 at the display window 12 prevents any external light from being reflected over the synthesized image 100 such that the latter can be always observed very well.

More particularly, the acrylic curved hood 13 has its center of curvature c located below the eye-point 40. As viewed from the eye-point 40, only the black-colored portion 110 of the table 14 will be reflected onto the acrylic curved hood 13, without any obstruction in viewing the synthesized image 100.

In accordance with the present invention, the synthesized image 100 is displayed by superimposing the three-dimensional image of the diorama 50 on the video scene displayed on the CRT 46. Particularly, the characters each of which is a target are controllably displayed as if they jump into the rooms in combination with the motion of the movable parts 56 in the diorama 50, as shown in FIGS. 1(B) and 2(B).

Therefore, the player may shoot characters sequentially jumping into the rooms through the movable parts 56 of the diorama 50 as shown in FIG. 1(C) or 2(C), while viewing the synthesized scene displayed in the display window 12 at its deep position. He can play the shooting game with a visually varied and improved representation.

It is to be understood that the present invention is not limited to the illustrated and described embodiment, but many modifications and changes may be carried out within the scope of the present invention.

For example, the present invention may be applied to a widespread range of applications such as advertising display, educational representation and others.

Although the aforementioned embodiment has been described as to the acrylic curved hood 13 having its center of curvature located below the eye-point 40, such a hood may have its center of curvature C located above the eye-point. In the latter case, an external light blocking table is preferably provided to cover the reflected portion 110 of the acrylic curved hood 13.

As described, the present invention can provide a synthesized scene or image which is visually varied and improved in representation by taking a novel arrangement wherein the video scene is superimposed over the image of the diorama in combination with the motion of the movable parts in the diorama.

Furthermore, the transparent curved window provides a superior advantage that the synthesized scene can be viewed by the player very well without interruption by any external light.

In the shooting game machine incorporating the image synthesizing system of the present invention, the player may play a visually varied and improved shooting game since he shoots target characters synthesized and displayed in combination with the motion of the movable parts in the diorama.

Even if the target characters arbitrarily move about, the shooting game machine can judge in real time whether or not the respective characters are hit, from the data relating to the hit area and hit position.

We claim:

1. An image synthesizing system comprising:
   a half mirror located in an optical path extending toward a display section;
   a diorama disposed in one of transmissive- and reflective-side optical paths and having at least one movable part;
   a video display disposed in the other of said transmissive- and reflective-side optical paths such that a video scene of said video display will be superimposed over an image of said diorama through said half mirror;
   control means for controlling said video scene in a predetermined combination with the motion of the at least one movable parts in said diorama; and
   a transparent curved window having a center of curvature located one of below and above a visual point of an observer, whereby the image of said diorama can be superimposed over said video scene to form a synthesized image which is variable in connection with motion of the at least one movable part of said diorama.

2. The image synthesizing system as defined in claim 1 wherein a distance between said half mirror and said video display is one of substantially equal to and slightly smaller than a distance between said half mirror and said diorama and wherein the synthesized image is formed by superimposing the video scene one of on and slightly ahead of a surface of said diorama as viewed by said observer.

3. The image synthesizing system as defined in claim 1, further comprising a housing formed with an internal darkroom; a display window formed on a front side of said housing; and a total reflection mirror disposed within said housing at a position opposed to the visual point of said observer about said display window and inclined with a given angle and wherein said half mirror is disposed within said housing at a position opposed to the visual point of said observer through said total reflection mirror and inclined with a given angle.

4. The image synthesizing system as defined in claim 1, wherein said diorama is partitioned into a plurality of sections, each of which sections includes said movable part.

5. A shooting game machine comprising a half mirror located in an optical path extending toward a display section; a diorama disposed in one of transmissive- and reflective-side optical paths and having at least one movable part; a video display disposed in the other of said transmissive- and reflective-side optical paths such that a video scene of said video display including at least one target character will be superimposed over an image of said diorama through said half mirror; control means for controlling said video scene in a predetermined combination with motion of the movable part in said diorama; and a transparent curved window having a center of curvature located one of below and above a visual point of an observer, whereby the image of said diorama can be superimposed over said video scene to form a synthesized image in which said target character is variable in connection with the motion of the movable part of said diorama.

6. The shooting game machine as defined in claim 5, further comprising shooting means having trigger means and located opposed to a section displaying said synthesized image, said shooting means adapted to generate a trigger signal at each actuation of said trigger means; sight detecting means for detecting a sight position of said shooting means; and hit discriminating means for detecting a hit area of a target character based on a display position of the target character controlled by said control means and for judging whether said sight position is in said hit area when said trigger signal is generated, whereby the target character is synthesized in combination with the motion of the movable part in the diorama.

7. The shooting game machine as defined in claim 6 wherein said hit discriminating means includes a shape generator which has previously stored data indicative of hit area shapes of the target characters, said hit discriminating means being adapted to judge whether said sight position is in said hit area, based on the display position of the target character and the hit area shape data read out of said shape generator.

8. The shooting game machine as defined in claim 7 wherein a distance between said half mirror and said video display is one of substantially equal to and slightly smaller than a distance between said half mirror and said diorama and wherein the synthesized image is formed by superimposing the video scene one of on and slightly ahead of a surface of said diorama as viewed by said observer.

9. The shooting game machine as defined in claim 8, further comprising a housing formed with an internal darkroom; a display window formed on a front side of said housing; and a total reflection mirror disposed within said housing at a position opposed to the visual point of said observer about said display window and inclined with a given angle and wherein said shooting means is mounted outside of said hoiusing for horizontal and vertical rotations and can be moved to sight any point on said display window and wherein said half mirror is disposed within said housing at a position opposed to the visual point of said observer through said total reflection mirror and inclined with a given angle.

10. The shooting game machine as defined in claim 9 wherein said total reflection mirror is disposed at a position opposed to the visual point of the observer about the display window and inclined 45 degrees in a downward direction; said half mirror is disposed at a position opposed to the visual point of the observer through said total reflection mirror and is upwardly inclined at a right angle relative to said total reflection mirror; one of said diorama and video display is located in the reflective-side optical path of said half mirror at a position below said shooting means, the other of said diorama and video display being located in the transmissive-side optical path of said half mirror.

11. The shooting game machine as defined in claim 10, further comprising a score display located between said half mirror and said total reflection mirror, said score display being adapted to display the score on a part of said synthesized image.

12. The shooting game machine as defined in claim 6 wherein said shooting means is rotatable both in horizontal and vertical directions so that the shooting means can sight any point on display section for said synthesized image.

13. The shooting game machine as defined in claim 12 wherein said sight detecting means adapted to detect horizontal and vertical angles of rotation of said shooting means and to calculate the sight position of said shooting means based on the detected angles of rotation.

14. The shooting game machine as defined in claim 6 wherein a distance between said half mirror and said video display is one of substantially equal to and slightly smaller than a distance between said half mirror and said diorama and wherein the synthesized image is formed by superimposing the video scene one of on and slightly ahead of a surface of said diorama as viewed by said observer.

15. The shooting game machine as defined in claim 6 further comprising a housing formed with an internal darkroom; a display window formed on a front side of said housing; and a total reflection mirror disposed within said housing at a position opposed to the visual point of said observer about said display window and inclined with a given angle and wherein said shooting means is mounted outside of said housing for horizontal and vertical rotations and can be moved to sight any point on said display window and wherein said half mirror is disposed within said housing at a position opposed to the visual point of said observer through said total reflection mirror and inclined with a given angle.

16. The shooting game machine as defined in claim 15 further comprising a score display located between said half mirror and said total reflection mirror, said score display being adapted to display the score on a part of said synthesized image.

17. An image synthesizing system comprising:
a half mirror located in an optical path extending toward a display section;
a diorama disposed in one of transmissive- and reflective-side optical paths and having at least one movable part;
a video display disposed in the other of said transmissive- and reflective-side optical paths such that a video scene of said video display will be superimposed over an image of said diorama through said half mirror;
control means for controlling said video scene in a predetermined combination with the motion of the at least one movable part in said diorama;
a housing formed with and internal darkroom;
a display window formed on a front side of said housing; and
a total reflection mirror disposed within said housing at a position opposed to a visual point of said observer about said display window and inclined with a given angle and wherein said half mirror is disposed within said housing at a position opposed to the visual point of said observer through said total reflection mirror and inclined with a given angle, whereby the image of said diorama can he superimposed over said video scene to form a synthesized image which is variable in connection with the motion of the movable part of said diorama.

18. A shooting game machine comprising:
a half mirror located in an optical path extending toward a display section;
a diorama disposed in one of transmissive- and reflective-side optical paths and having at least one movable part;
a video display disposed in the other of said transmissive- and reflective-side optical paths such that a video scene of said video display including at least one target character will be superimposed over an image of said diorama through said half mirror;
control means for controlling said video scene in a predetermined combination with the motion of at least one movable part on said diorama, whereby the image of said diorama can be superimposed over said video scene to form a synthesized image in which said target character is variable in connection with the motion of the movable part of said diorama;
shooting means having trigger means and located opposed to the section displaying said synthesized image, said shooting means adapted to generate a trigger signal at each actuation of said trigger means;
sight detecting means for detecting a sight position of said shooting means:
hit discriminating means for detecting a hit area of a target character based on a display position of the target character controlled by said control means and for judging whether or not said sight position is in said hit area when said trigger signal is generated, whereby the target character is synthesized in combination with the motion of the movable part in the diorama;
a housing formed with an internal darkroom;
a display window formed on a front side of said housing; and
a total reflection mirror disposed within said housing at a position opposed to a visual point of said observer about said display window and inclined with a given angle, wherein said shooting means is mounted outside of said housing for horizontal and vertical rotations and is movable to sight any point on said display window and wherein said half mirror is disposed within said housing at a position opposed to the visual point of said observer through said total reflection mirror and inclined with a given angle.

* * * * *